US005170987A

United States Patent [19]

Krauss et al.

[11] Patent Number: 5,170,987

[45] Date of Patent: Dec. 15, 1992

[54] ELECTROMAGNETICALLY ACTUATABLE FUEL INJECTION VALVE

[75] Inventors: Rudolf Krauss, Stuttgart; Ferdinand Reiter, Markgröningen, both of Fed. Rep. of Germany

[73] Assignee: Robert Bosch GmbH, Stuttgart, Fed. Rep. of Germany

[21] Appl. No.: 834,276

[22] PCT Filed: May 25, 1990

[86] PCT No.: PCT/DE90/00378

§ 371 Date: Feb. 12, 1992

§ 102(e) Date: Feb. 12, 1992

[87] PCT Pub. No.: WO91/02895

PCT Pub. Date: Mar. 7, 1991

[30] Foreign Application Priority Data

Aug. 24, 1989 [DE] Fed. Rep. of Germany ....... 3927392

[51] Int. Cl.[5] ........................ F16K 31/06; F02M 51.06

[52] U.S. Cl. .......................... 251/129.21; 251/129.15; 239/585.4

[58] Field of Search ...................... 251/129.21, 129.15; 239/585.4, 585.1, 585.5

[56] References Cited

U.S. PATENT DOCUMENTS 4,509,693 4/1985 Nakai .............................. 239/585.5

4,944,486 7/1990 Babitzka ......................... 251/129.21

FOREIGN PATENT DOCUMENTS 0141048 5/1985 European Pat. Off. .

2049671 4/1972 Fed. Rep. of Germany .

3427526 2/1986 Fed. Rep. of Germany .

*Primary Examiner*—Arnold Rosenthal

*Attorney, Agent, or Firm*—Michael J. Striker

[57] ABSTRACT

The electromagnetically actuatable fuel injection valve (1) for spark ignition engines improves, with a relatively low production outlay, the operation and the frictional behavior by arranging between the armature (15) and the stop face (16) a lift-limiting plate (21) which bears on the stop face side a bearing plate (27) which is acted upon by the spring (29), and is seated with a curved pressing surface (25) on an inner, curved receiving surface (23) of the lift-limiting plate (21) which connects with an outer, plane annular face (22) located opposite the stop face (16), and by the lift-limiting plate (21) being supported on the opposite side with a curved bearing surface (19) on a correspondingly curved bearing surface (17) of the armature (15).

6 Claims, 1 Drawing Sheet

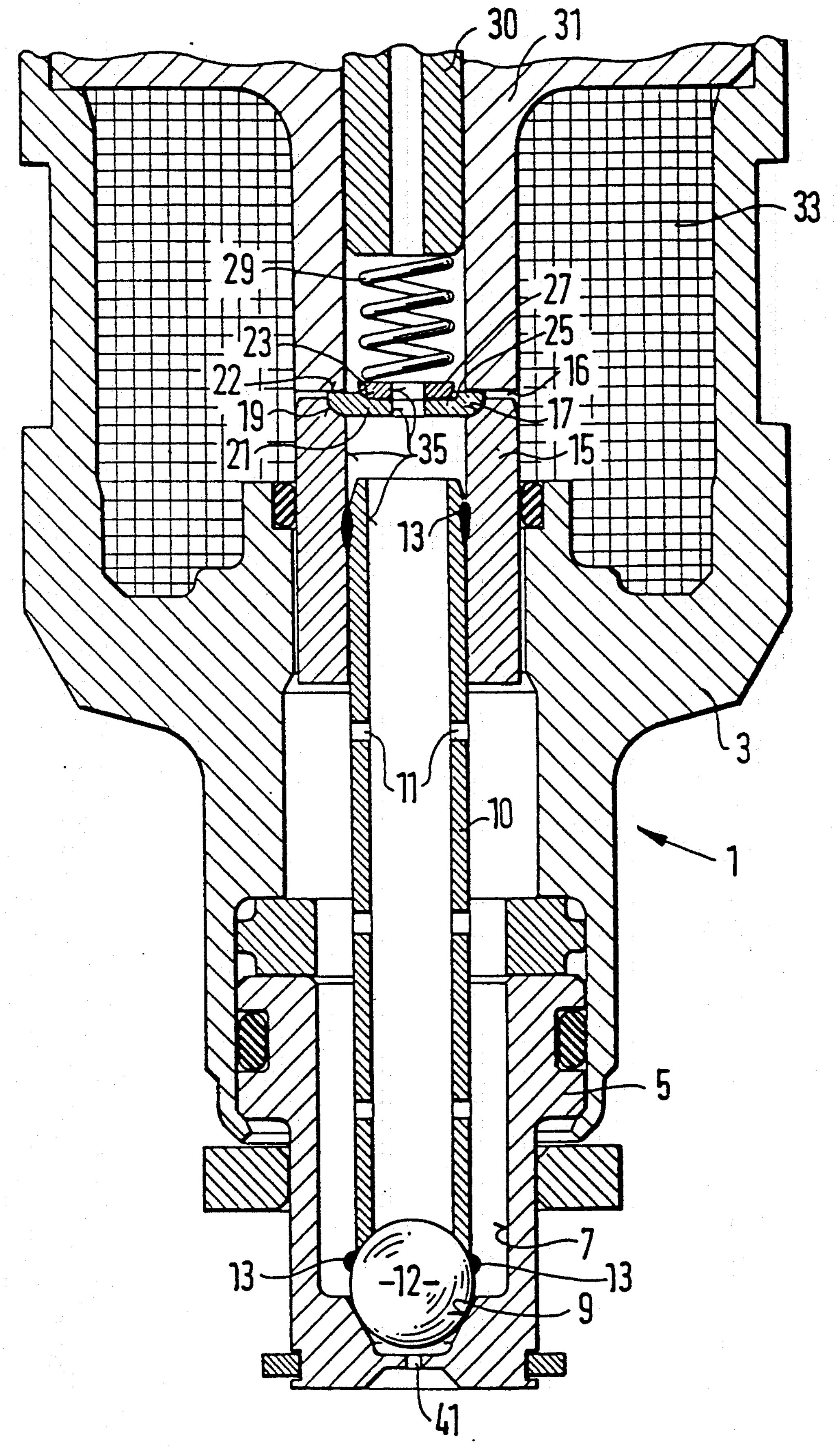
30
31
33
29
27
23
25
22
16
19
17
21
35
15
13
3
11
10
1
5
7
13
12
13
9
41

ELECTROMAGNETICALLY ACTUATABLE FUEL INJECTION VALVE

BACKGROUND OF THE INVENTION

The present invention relates to an electromagnetically actuable fuel injection valve.

An electromagnetically actuable fuel injection valve is known comprising a valve housing, a valve seat body provided with a bore and a valve seat, a valve closing element extending into the bore to cooperate with the valve seat and which carries on its end remote from the valve seat an armature, a compression spring which urges the armature and the valve closing element toward the valve seat and an inner pole of a magnetic coil having a stop face located opposite the armature.

U.S. Pat. No. 4,700,891, which corresponds to DE-OS 35 35 124, has already disclosed a fuel injection valve of this kind. In the latter, an internal pole of a magnetic coil forms a direct stop surface for an armature of a valve closing element. The valve closing element has a needle-shaped valve closing body. Spherical valve closing bodies are also customary for fuel injection valves.

When the fuel injection valve is excited the valve closing element is displaced axially with the valve closing body to such an extent that the valve seat is cleared and the fuel can be sprayed. The displacement of the fuel closing body in the opening direction is effected by means of the force of the magnetic coil, through which current flows, on the armature. The motive friction of the valve closing body in the bore on the valve seat body, in particular in the case of canting as a result of skewing, leads to hysteresis errors in the driving of the fuel injection valve and skewing of the valve closing element additionally leads to a non-uniform fuel jet shape. This results in a degraded fuel preparation and differences in the fuel supply of the individual cylinders of internal combustion engines. The wear in the region of the valve seat and the armature caused by the canting leads to further functional impairments.

SUMMARY OF THE INVENTION

It is an object of the present invention to provide an improved electromagnetically actuable fuel injection valve having none of the above-described disadvantages.

This object and others which will be made more apparent hereinafter is attained in an electromagnetically actuable fuel injection valve comprising a valve housing, a valve seat body provided with a bore and a valve seat; a valve closing element extending into the bore to cooperate with the valve seat and carrying an armature on an end of the valve closing element remote from the valve seat; a compression spring positioned to act on the armature and urge the armature and the valve closing element toward the valve seat and an inner pole of a magnetic coil having a stop face. The inner pole is positioned so that the stop face is opposite to the armature.

According to the invention a lift-limiting plate is arranged between the armature and the stop face and a bearing plate is located between the lift-limiting plate and the compression spring and is acted on by the compression spring. The lift-limiting plate on the stop face side thereof is provided with a curved receiving surface and a peripheral outer plane annular face connected with the curved receiving surface, the bearing plate has a pressing surface shaped to fit the curved receiving surface in which the bearing plate is seated under action of the compression spring. The peripheral outer plane annular face is located opposite the stop face and on its armature side the lifting-limiting plate has a curved bearing surface which fits a correspondingly curved bearing surface of the armature so that the lift-limiting plate is supported with the curved bearing surface of the lift-limiting plate engaged in the correspondingly curved bearing surface of the armature.

The fuel injection valve according to the invention has in contrast with the above the advantage that the valve closing body is no longer canted even when the spring is askew or in the event of fitting errors of the guides or of the stop faces, but rather is automatically centered with minimal friction and wear. A more precise, more rapid response of the fuel injection valve, a more accurate injection time and a more exact metering of the fuel with improved fuel jet shape and a spatially more uniform distribution of the fuel is achieved. In a preferred embodiment of the invention the correspondingly curved bearing surface of the armature and the curved receiving surface of the lift-limiting plate are concave and the pressing surface of the bearing plate and the curved bearing surface of the lift-limiting plate are convex.

In other embodiments of the invention the lift-limiting plate and the bearing plate are each ring-like and shaped to be stackable one on the other. The lift-limiting plate, the armature and the bearing plate having throughgoing openings which are circular and coaxial with each other.

BRIEF DESCRIPTION OF THE DRAWING

The objects, features and advantages of the present invention will now be illustrated in more detail by the following detailed description, reference being made to the accompanying drawing in which:

The sole FIGURE is an axial cross sectional view of a fuel injection valve according to the invention.

DETAILED DESCRIPTION OF THE INVENTION

The fuel injection valve 1 shown in the drawing for a fuel injection system of mixture-compressing, spark-ignited internal combustion engines has a valve housing 3 which receives a valve seat body 5 with a central bore 7. A tubular valve closing element 10 with radial openings 11 is arranged in the bore 7 with an endside valve seat 9. On the end closest to the valve seat 9, the valve closing element 10 has a valve closing body 12, for example in the form of a hardened sphere, and on the end remote from the valve seat 9 it carries an armature 15 of low-retentivity material which is attached to the valve closing element 10 by a weld connection 13. Opposite the free end of the armature 15 there is a stop face 16 on an inner pole 31, of magnetic coil 33. There is a narrow gap between the stop face 16 and the free end of the armature 15.

The armature 15 is provided opposite the stop face 16 with a concavely correspondingly curved bearing surface 17. On the latter, a convexly curved bearing surface 19 of a lift-limiting plate 21—which is harder than the material of the armature 15—shaped like a ring is supported in a sliding fashion. The lift-limiting plate 21 is provided on the side opposite the curved bearing surface 19 an annular, concave curved receiving surface 23 which connects at its outer edge with a peripheral outer plane annular face 22. The annular face 22 is supported at least partially on the stop face 16 after the completion of the opening travel of the valve. Between the stop face 16 and the armature 15 a residual air gap is determined by the height dimension of the lift-limiting plate 21.

On the curved receiving surface 23, a bearing plate 27, constructed as a collar, of a compression spring 29 is supported with a convex pressing surface 25 in a sliding fashion. The compression spring 29 is supported on the end remote from the bearing plate 27, on an adjusting rod 30 in the inner pole 31 of a magnetic coil 33. The lift-limiting plate 21 and the bearing plate 27 are provided with central continuous openings 35′ and 35″ which have a common axis with central opening 35 of the armature 15 and of the valve closing element 11.

In order to open the fuel injection valve 1, an electric circuit (not illustrated) of the magnetic coil 33 is closed. The magnetic forces which are subsequently active and are directed by the inner pole 31 attract the armature 15. Together with the latter, the valve closing body 12 of the valve closing element 10 is moved away from the valve seat 9 so that the fuel can pass through the valve closing element 10 and the radial bores 11 via the bore 7 to the valve seat 9 and downstream to its at least one outlet opening 41 and can be sprayed.

The valve closing element 10 is acted on by the compression spring 29 in the closing direction via the bearing plate 27. Because of the spherical joint-like coupling of the armature 15 to the compression spring 29, the valve closing element 10 is automatically centered in the fuel flow both by the possible tilting between the bearing plate 27 and the lift-limiting plate 21 and the possible additional tilting between the lift-limiting plate 21 and the armature 13 by bearing surfaces 17, 19. The lift-limiting plate 21 can come to rest in a freely tiltable manner with respect to the support plate 27 or the compression spring 29 against the stop face 16 without special forces counter to the spring being necessary in the event of a skew position of the spring 29. The exact opening travel can be achieved in this way without delay. In the case of the full opening travel, the valve closing element 10 is still freely tiltable, specifically with respect to the lift-limiting plate 21, so that the best centring position for the valve closing body 12 on the valve seat 5 is always ensured. The forces acting on the valve closing body 12 on the valve seat side from the fuel or the flow of liquid center the valve closing element 10 very exactly so that a particularly uniform fuel jet shape of the sprayed fuel is obtained. This process is necessary per se only for the very first few injection travels of the valve closing element 10 because the valve closing element 10 then maintains the optimum position under normal conditions. However, if due to extraordinary circumstances the centering position is changed, the position is always automatically restored in the previously described manner.

The entire friction surface which can be lubricated is larger due to the curvature of the bearing surfaces which act on one another than in comparable straight bearing surfaces and more convenient with respect to tribology. This and the pairing of material from the low-retentivity material of the armature 15 and the hard material of the lift-limiting plate 21 reduce the wear of the contacting bearing surfaces between armature 15 and the stop face 16 but also between the valve closing body 12 and the valve seat body 5. The gap remaining between the armature 15 and the stop face 16 is necessary and is designated according to the prior art as a residual air gap. It has only secondary importance in the direct context of the invention. Therefore, further explanations of this are not given.

It will be understood that each of the elements described above, or two or more together, may also find a useful application in other types of constructions differing from the types described above.

While the invention has been illustrated and described as embodied in an electromagnetically actuable fuel injection valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an electromagnetically actuable fuel injection valve (1) having a valve housing (3), a valve seat body (5) provided with a bore (7) and a valve seat (9); a valve closing element (10) extending into the bore (7) to cooperate with the valve seat (9) and carrying an armature (15) on end end of the valve closing element (10) furthest from the vavle seat (9); a compression spring (29) positioned to act on the armature (15) and urge the armature in a direction toward the valve seat (9) and an inner pole (31) of a magnetic coil (33) having a stop face (16) said inner pole (31) being positioned so that the stop face (16) is opposite to the armature (15), the improvement comprising a lift-limiting plate (21) arranged between the armature (15) and the stop face (16) and a bearing plate (27) located between the lift-limiting plate (21) and the compression spring (29) acted on by the compression spring (29), and wherein the lift-limiting plate (21) includes a curved receiving surface (23) and a peripheral outer plane annular face (22) connected with the curved receiving surface (23), the bearing plate (27) having a curved pressing surface (25) shaped to fit the curved receiving surface (23) in which the bearing plate (27) is seated under action of the compression spring (29), and wherein the peripheral outer plane annular face (22) is located opposite the stop face (16), and the lifting-limiting plate has a curved bearing surface (19) which fits a correspondingly curved bearing surface (17) of the armature (15) so that the lift-limiting plate (21) is supported with the curved bearing surface (19) engaged in the correspondingly curved bearing surface (17) of the armature.

2. Fuel injection valve according to claim 1, wherein the correspondingly curved bearing surface (17) of the armature and the curved receiving surface (23) of the lift-limiting plate are concave and the curved pressing surface (25) of the bearing plate and the curved bearing surface (19) of the lift-limiting plate are convex.

3. Fuel injection valve according to claim 1, wherein said surfaces are all curved in a same direction.

4. Fuel injection valve according to claim 1, wherein the lift-limiting plate (21) and the bearing plate (27) are each ring-like and shaped to be stackable one on the other.

5. Fuel injection valve according to claim 1, wherein the lift-limiting plate (21) and the bearing plate (27) having throughgoing openings (35).

6. Fuel injection valve according to claim 5, wherein the throughgoing openings (35) of the lift-limiting plate (21) and the bearing plate (27) are circular and coaxial with armature (15).

* * * * *